United States Patent [19]

Scerbak

[11] Patent Number: 4,955,034
[45] Date of Patent: Sep. 4, 1990

[54] PLANAR SOLID STATE LASER RESONATOR

[75] Inventor: David G. Scerbak, Fremont, Calif.

[73] Assignee: Electro-Optics Technology, Inc., Fremont, Calif.

[21] Appl. No.: 317,316

[22] Filed: Mar. 1, 1989

[51] Int. Cl.$^5$ .............................................. H01S 3/083
[52] U.S. Cl. ....................................... 372/94; 372/66; 372/93; 372/99; 372/100
[58] Field of Search ........................ 372/66, 92, 93, 94, 372/98, 100, 99

[56] References Cited

U.S. PATENT DOCUMENTS

| | | | |
|---|---|---|---|
| 3,248,671 | 4/1966 | Dill et al. | 372/94 |
| 3,402,364 | 9/1968 | Lang | 372/41 |
| 3,500,240 | 3/1970 | Kessler | 372/94 |
| 3,530,397 | 9/1970 | Suzuki et al. | 372/66 |
| 4,653,056 | 3/1987 | Baer et al. | 372/21 |
| 4,656,635 | 4/1987 | Baer et al. | 372/9 |
| 4,701,929 | 10/1987 | Baer et al. | 372/9 |
| 4,739,507 | 4/1988 | Byer et al. | 372/66 |
| 4,739,508 | 4/1988 | Clark | 372/99 |
| 4,747,111 | 5/1988 | Trutna, Jr. et al. | 372/94 |
| 4,756,003 | 7/1988 | Baer et al. | 372/9 |
| 4,764,933 | 8/1988 | Kozlovsky et al. | 372/66 |
| 4,797,896 | 1/1989 | Kane | 372/66 |

FOREIGN PATENT DOCUMENTS 1212635 3/1966 Fed. Rep. of Germany.

OTHER PUBLICATIONS

Nilsson et al., "Monolithic Nonplanar Ring Lasers: Resistance to Optical Feedback", SPIE, vol. 912, Pulsed Single-Frequency Lasers: Technology and Applications, (1988), pp. 13–18.

Kane et al., "Monolithic, Unidirectional Single-Mode Nd:YAG Ring Laser", Optics Letters, vol. 10, No. 2, Feb. 1985, pp. 65–67.

Efficient LiNdP$_4$O$_{12}$ Lasers Pumped With a Laser Diode, Kubodera et al., Applied Optics, vol. 18, No. 23, Dec. 1979, pp. 3882–3883.

Trutna et al., Optics Letters Unidirectional Diode-Laser-Pumped Nd:YAG Ring Laser with a Small Magnetic Field, Optical Society of America, Apr., 1987, vol. 12, No. 4, pp. 248–250.

Owyoung et al., "Stress-Induced Tuning of a Diode-Laser-Excited Monolithic Nd:YAG Laser," Optics Letters, vol. 12, No. 12, Dec. 1987, pp. 999–1001.

Kane et al., "Fast Frequency Tuning and Phase Locking of Diode-Pumped Nd:YAG Ring Lasers", Optics Letters, vol. 13, No. 11, Nov. 1988, pp. 970–972.

Behfar-Rad et al., "Rectangular and L-Shaped GaAs/AlGaAs Lasers with Very High Quality Etched Facets," Appl. Phys. Lett., vol. 54, No. 6, Feb. 6, 1989, pp. 493–495.

*Primary Examiner*—William L. Sikes
*Assistant Examiner*—Georgia Y. Epps
*Attorney, Agent, or Firm*—Townsend and Townsend

[57] ABSTRACT

A planar unidirectional solid state laser is realized in non-birefringent (isotropic or cubic) material by inducing a reciprocal polarization rotation along a lasing path within the material through a mechanical stress or by modifying the material to change the index of refraction along the lasing path. Together with means for providing nonreciprocal polarization rotation, such as with the Faraday Effect, the invention enables construction of unidirectional lasers, and more specifically thick film, single-frequency CW or Q-switched tunable ring lasers, with the advantage of both flat and ring structures. A variable-output coupled solid state ring laser employing an evanescent wave output coupling in the form of a prism is also described.

50 Claims, 7 Drawing Sheets

PLANAR SOLID STATE LASER RESONATOR

BACKGROUND OF THE INVENTION

This invention relates to solid state laser resonators and more particularly to a solid state laser resonating cavity in which the path of a lasing beam comprises at least three points of reflection which are confined to a single plane. The invention may be used to produce single-longitudinal mode unidirectional laser radiation, which has wide applications.

It is often desirable to have a laser which lases single frequency. When the solid state lasant is a homogeneously-broadened material such as Nd:YAG, single longitudinal mode oscillation should, in theory, be readily achieved when continuous wave (CW) pumping is employed. In practice, single longitudinal mode lasing is difficult to achieve in conventional lasers. Conventional linear lasers consist of two reflecting mirrors forming a linear resonator producing standing waves as the normal modes of oscillation. At the nodes of a given standing wave the gain is not saturated, allowing one or more other standing waves of different frequency to access this gain and be above threshold for lasing. This is termed "spatial hole burning".

Another type of laser is the ring laser. A characteristic of a ring laser which differentiates it from a conventional linear laser is the ability to lase in a single direction (unidirectional). When a ring laser formed by at least three reflective mirrors is caused to lase unidirectionally, the normal mode of oscillation is a travelling wave whose path forms a polygon (ring) dictated by the number and configuration of mirrors in the resonator. In contrast to a standing wave, the travelling wave saturates the gain uniformly and the ring resonator lases in a single longitudinal mode as predicted.

Ring lasers of the prior art normally support counter-propagating oscillations. Such counter-propagating waves can interfere with each other, resulting in spatial hole burning as per conventional linear lasers.

It is well known that ring lasers can be made to lase unidirectionally by introducing some mechanism for causing one propagation direction to have less round-trip loss than the other. However, such a round-trip loss differential for unidirectional CW lasing is typically very small (<1%). The standard technique for generating such a differential loss is to combine within the ring laser three distinct elements: nonreciprocal polarization rotation, reciprocal polarization rotation, and a polarizer. In one direction of propagation the rotation from reciprocal polarization rotation and nonreciprocal polarization rotation are additive. This larger rotation results in a linear polarization mode which suffers high loss at the polarizer. In the opposite direction of propagation the rotation from reciprocal polarization and nonreciprocal polarization rotations subtract resulting in a polarization mode which has lower losses at the polarizer.

In the standard art, nonreciprocal polarization rotation is achieved by placing a magneto-optic element in the presence of a strong magnetic field. The effect is known as the Faraday Effect. Reciprocal polarization rotation is commonly achieved with a linear birefringent waveplate of suitable phase retardation.

Nilsson et al., *SPIE Proceedings*, Vol. 912, p. 13 (Jan. 1988), has described the special aspects of unidirectional ring lasers which allow them to exhibit reduced effects caused by scattered output light (feedback) from external objects, such as uncoated lenses and optical fibers. Feedback into conventional lasers is a destabilizing effect resulting in frequency and amplitude fluctuations.

Practical implementation of a conventional ring laser results in a resonator consisting of numerous parts which is difficult to align and keep aligned. In addition to such long term mechanical instability, fast relative motions of the ring laser resonator mirrors manifest themselves as rapid frequency fluctuations, limiting the frequency stability of the ring laser. It is desirable to reduce the number of elements required to achieve unidirectional lasing to ideally a single piece of solid state laser material, such single piece solid state laser being termed monolithic. The monolithic laser is preferably configured so as to incorporate all elements responsible for unidirectional lasing.

Kane and Byer have disclosed a "Solid-State Non-Planar Internally Reflecting Ring Laser" in U.S. Pat. No. 4,578,793, issued Mar. 25, 1986. The apparatus described therein is a monolithic ring resonator fabricated as a nonplanar internally-reflecting prism. Such a monolithic ring laser incorporates at least four mirrored surfaces to define a ring ray path which travels along two distinct planes. This nonplanarity serves to generate reciprocal polarization rotation within the monolithic ring resonator. By locating the monolithic resonator within a strong magnetic field and choosing a solid state lasing material possessing finite magneto-optic properties, nonreciprocal Faraday Effect polarization rotation takes place within the monolithic resonator itself. Non-normal incidence of the internal ray path at the dielectric coated output mirror serves as a partial polarizer. Such monolithic nonplanar ring lasers demand adherence to strict dimensional and angular fabrication tolerances. Moreover, the nonplanar nature of this monolithic ring resonator requires numerous fabrication steps, making high volume manufacture costly. Kane has suggested that, although a planar ring laser would alleviate such difficulties, a planar unidirectional monolithic ring oscillator is not possible. (See Ph.D Dissertation, Stanford University, 1986.)

Another nonplanar design is described in Trutna et al., "Unidirectional diode-laser-pumped Nd:YAG ring laser with a small magnetic field," *Optics Letters*, Vol. 12, No. 4, pp. 248–250, Apr. 1987. The Trutna paper described a nearly planar design to better match the reciprocal and nonreciprocal polarization rotations.

It is known in the prior art, as for example, Kubodera et al., *Appl. Opt.* 18, 3882 (1979), that axial pumping with a laser is a means for achieving single transverse mode operation in solid state lasers. The laser pump light is conditioned so as to excite a region of the laser material totally contained within the $TEM_{00}$ mode volume. This causes the $TEM_{00}$ mode to access the available gain more efficiently than other higher order transverse modes. The $TEM_{00}$ mode saturates the gain, and such a laser is "gain bound" to lase in a single transverse mode. This is in contrast to conventional lasers, which pump the entire laser material and use a lossy aperture to suppress higher order transverse modes which would otherwise lase due to the large pumped volume. Axial pumping provides a means to preferentially excite the $TEM_{00}$ mode, without the negative effects on efficiency associated with lossy apertures.

Figure 18:
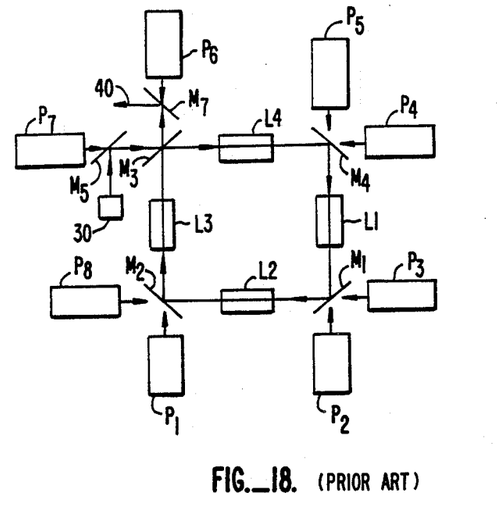
FIG. 18 is a top plan view of axially pumping with multiple sources as known from the prior art wherein a unidirectional ring laser consisting of four axially pumped lasers is pumped by eight laser diode sources.

Sipes, Jr., U.S. Pat. No. 4,710,940, has disclosed a method of pumping a plurality of lasing media, each with individual laser diode pumps and of providing a means for coupling the individual lasing media together in a unidirectional ring laser. The multiplicity of individual elements give rise to concerns about stability and other limitations known to conventional ring lasers. FIG. 18 represents the prior art of Sipes, Jr., for axially pumping a unidirectional Nd:YAG ring laser. Gain media L1, L2, L3 and L4 are coupled together by ring resonator mirrors M1, M2, M3 and M4. Mirrors M1, M2 and M4 are highly reflective at the 1064 nm lasing wavelength of Nd:YAG and transmissive at the wavelength of laser diode pump sources P1, P2, P3, P4, P5 and P8. Mirror M3 is the output coupler of the ring resonator and is also transmissive to pump sources P6 and P7. Mirrors M5 and M7 are high reflectors at 1064 nm and transmissive at the pump wavelength. Unidirectional lasing output 40 is meant to occur due to injection of 1064 nm laser light from InGaAlAs laser diode 30. No solid state resonator structure suitable for use in this configuration has been suggested.

It has been reported that it is often desirable to rapidly tune the frequency of the ring laser output in a controlled fashion. Prior art frequency tuning of monolithic lasers has included temperature, piezoelectric and magnetic tuning. T. J. Kane and R. L. Byer, *Opt. Lett.* 10, 65 (1985); A. Owyoung and P. Esherick, *Opt. Lett.* 12, 999 (1987); and T. J. Kane and E. A. P. Cheng, *Opt. Lett.* 13, 970 (1988). Piezoelectric tuning has been the preferred method for achieving fast tuning rates. It is therefore desirable for any new ring laser to incorporate tuning means which are at least as fast and practical to implement as those currently known.

SUMMARY OF THE INVENTION

According to the invention, a planar unidirectional solid state laser is realized in non-birefringent (isotropic or cubic) material by inducing a reciprocal polarization rotation along a lasing path within the material through a mechanical stress or by modifying the material to change the index of refraction along the lasing path. Together with means for providing nonreciprocal polarization rotation, such as with the Faraday Effect, the invention enables construction of unidirectional lasers, and more specifically thick film, single-frequency CW or Q-switched tunable ring lasers, with the advantages of both flat and ring structures. A variable-output coupled solid state ring laser employing an evanescent wave output coupling in the form of a prism is also described.

It is desirable according to the invention to provide a solid state ring laser, especially which yields unidirectional lasing and thereby achieves single longitudinal mode operation. It is also desirable to provide for a solid state ring laser utilizing a unidirectional design reducing sensitivity to feedback. It is further desirable to provide a laser of simple construction immune to mechanical instabilities and possessing excellent frequency stability. To this end, a monolithic design is used. It is further desirable to provide a ring laser which preferentially supports the TEM$_{00}$ mode. It is further desirable to provide for a planar monolithic unidirectional ring laser which can be tuned slowly with temperature. Rapid tuning is achieved with piezoelectric and/or electromagnetic tuning. Rapid electro-optic tuning can apply to cubic crystals lacking a center of symmetry.

The preferred embodiment is a single piece of solid state lasing material having three reflecting faces, two of which are totally internally reflecting such that the beam path within the crystal forms a triangle, and in a specific embodiment an isosceles triangle. The base of such an isosceles triangle lies between the two total internally reflecting faces.

In the preferred embodiment, a stress of a controlled type and direction is applied transversely to the solid state material at the base of the isosceles ring laser beam path. This stress is inclined to a normal to the plane of the ring by a small angle $\beta$. Such applied stress serves as an "effective waveplate" whose principal axis are inclined similarly to the plane of lasing. The amount of phase shift in this effective waveplate is related to the magnitude of the applied stress.

When this preferred embodiment of the present invention is placed in a magnetic field of sufficient component perpendicular to the base of the triangular beam path and in the plane of the beam path and axial pumped with a laser beam of sufficient absorbed power, single direction lasing will take place within the ring, such unidirectional lasing being of single longitudinal and transverse mode operation.

The non-reciprocal nature of the ring, as manifest by unidirectional lasing, serves to isolate the ring laser from destabilizing effects of external reflections. The monolithic construction ensures excellent mechanical alignment stability. The monolithic design also results in excellent frequency stability because the high frequencies required to drive the natural acoustic resonances of the monolithic ring cannot propagate through the mounting hardware. Due to the efficiency of laser diode pumping, the monolithic ring can be readily temperature stabilized with a heater or thermoelectric cooler. The amplitude and frequency stability of the laser diode pump itself helps contribute to the thermal stability of the ring by ensuring consistent absorbed power. Conventional solid state lasers using flashlamps and water cooling are the source of much of the thermal and mechanical instabilities contributing to the frequency fluctuations of conventional lasers.

The planar nature of the ring is much easier to fabricate than nonplanar monolithic ring lasers. The three-mirrored single piece of solid state lasant in the preferred embodiment is essentially a pie-shaped slab with the two identical sides from the apex being flat, total internal reflecting surfaces, with the curved face being a dielectrically-coated output surface having a spherical curvature to ensure a stable resonating mode. Such a pie-shaped slab could be made in high volume for instance, by first fabricating a long prism whose cross section is pie-shaped, then dicing off individual slabs of suitable thickness and finally fabricating the spherical curvature on the curved surface. Alternatively, the pie-shaped structure could be created by deposition using thick film fabrication techniques. The solid state lasant material can be any isotropic, homogeneously broadened host material where a stoichiometric part of a crystalline structure is the active material or a dopant is added as the active lasing ions to the host material to form an active material. The lasing ions will typically be one or more rare earth elements. Examples of suitable solid state lasant materials are Nd:YAG, Nd:GGG, Er:YAG, and Ho:Tm:YAG.

The ring laser of the present invention uses axial pumping with a laser to excite the active ion of the lasant. The pump is frequency tuned to a suitable absorption region of the lasant. Matching the laser pump light to the ring laser mode volume will ensure single TEM$_{00}$ transverse mode operation. Herein, "matching" refers to correcting by conventional means (e.g., cylindrical or spherical lenses, off-axis mirrors or beam-expansion prisms) the beam diameter, beam divergence and astigmatism (if any) of the laser pump light such that all light is absorbed in an area smaller than the ring laser beam diameter throughout the significant absorption length. Such matching by conventional means allows for the use of astigmatic, multitransverse mode, broad-area laser diodes and laser diode arrays, in addition to other single transverse mode laser (diode) pump sources.

As noted previously, Sipes has disclosed a method for pumping multiple lasing mediums and coupling them together with multiple mirrors in a ring structure. It is desirable to scale the output power of the monolithic unidirectional ring laser of the present invention by using multiple pump sources. Monolithic nonplanar unidirectional ring lasers of the prior art have not been amenable to pumping with multiple sources because they use total internal reflection surfaces to generate reciprocal polarization rotation. It is possible to pump the monolithic unidirectional planar ring laser of the present invention through each of its mirrored surfaces. In contrast to the total internal reflections of the preferred embodiment, to be pumped in this manner, the angles of incidence of the internal lasing mode for each non-output coupling mirror are made less than the total internal reflection angle for the lasant material at the pump wavelength. Each such mirror is then dielectrically coated to be highly reflective at the internal lasing wavelength and highly transmissive to the pump source wavelength, incidence angle and polarization.

Tuning of the planar monolithic ring laser can be achieved by temperature scanning the ring. The tuning rate is limited in speed by the thermal time constant of the solid state lasant used. Rapid tuning in the preferred embodiment can be made to occur by applying the mechanical stress via a piezoelectric element. A changing voltage to the piezoelectric element will cause it to expand or constrict accordingly, thereby changing the magnitude of the applied stress. As the magnitude of stress varies, the phase retardation of the "effective waveplate" changes proportionately, thereby tuning the resonant frequency of lasing. The maximum tuning rate allowed with piezoelectric tuning can be fast. However tuning rates in the range of 100-200 KHz excite acoustic resonances within the monolithic solid state ring, causing fluctuations of the ring laser output. Additionally, the acoustic power associated with high frequency piezo-electric tuning generates heat which will temperature tune the ring laser. Monolithic nonplanar rings which are piezo-electrically tuned have been described in the literature. Such tuning is achieved by attaching a thin, flat, piezo-electric device to the large flat surface of such nonplanar rings. The piezo device changes its length with voltage, exerting shear stresses on the nonplanar ring, which effectively change the ring path dimensions. While such tuning means are also applicable to the present invention, a unique feature of the monolithic planar ring of the present invention is the ability to use properly applied piezo-electrically controlled stress to serve the dual purpose of tuning the ring laser while simultaneously performing the function of reciprocal rotation. Rapid tuning of the ring laser in the preferred embodiment can also result from changing the magnitude of the magnetic field with an electromagnet. Such tuning is limited in speed by the inductance of the electromagnet coils, but it could be exceptionally fast if the electromagnet were wound for instance with superconducting wire.

In addition to the dielectrically coated output mirror of the preferred embodiment, it is possible to achieve output coupling and partial polarization by using evanescent wave coupling at a total internally reflecting mirror of the ring laser of the present invention or any monolithic ring laser. Locating a solid state (high index of refraction) material such as a prism next to a total internal reflection surface with a small variable gap (approximately one-half wavelength) is known to result in frustrated total internal reflection or evanescent wave coupling. The amount of evanescent wave coupling of the internal ring laser circulating power which occurs is related to the thickness of the gap, such gap being at most a few wavelengths thick. Polarization occurs because such evanescent wave coupling will preferentially couple the "P" polarization (E-field in the plane of lasing) of the reflection.

By fabricating the above prism used for evanescent wave coupling of a piezoelectric material or by bonding the prism to a piezoelectric material it is possible to modulate the output coupling by changing the thickness of the gap between the monolithic ring laser total internal reflection surface and the prism material. The prism structure is rigidly fixed on one edge such that when a properly-oriented voltage is applied to the piezoelectric material it changes dimension in the direction of the gap such that the gap thickness changes. If the parameters are chosen such that the gap can vary between a small thickness such that the losses due to evanescent wave coupling keep the laser below threshold and a thickness large enough to reduce losses to an extent that threshold can be exceeded the monolithic ring resonator can be Q-switched.

Q-switching is a commonly used method to increase the output power of lasers by causing them to emit pulses of high peak power. While the losses maintain the ring laser below threshold, the monolithic lasant material develops a large population inversion. When the losses are removed the ring laser will emit a pulse of high peak power (relative to CW lasing). For efficient Q-switching, it is necessary to switch between high loss and low loss states in less time than required for a Q-switched pulse to buildup from noise. For a reasonably high-gain lasant such as Nd:YAG, such Q-switched pulse buildup time is commonly seen to be on the order of 20 nanoseconds. Efficient Q-switching in Nd:YAG as it applies to the present invention, and monolithic ring lasers in general, would therefore require the piezoelectric prism to change the gap thickness in less than approximately 20 nanoseconds. In general, Q-switching with such an evanescent wave loss mechanism could be used with evanescent wave output coupling or the dielectric mirror output coupling of the preferred embodiment. The invention will be better understood upon reference to the following detailed description in connection with the accompanying drawings.

DESCRIPTION OF PREFERRED EMBODIMENTS

Figure 1:
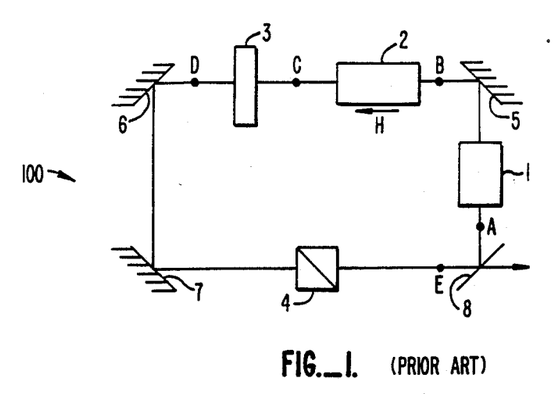
FIG. 1 is a schematic diagram of a conventional prior art multi-element unidirectional ring laser resonator.

To illustrate the advance over the art, it is helpful to examine first the standard art for constructing ring lasers. Referring first to FIG. 1, there is shown a prior art ring laser resonator 100 wherein mirrors 5, 6, 7 and 8 form the ring resonator. Other optical elements in the beam path A-B-C-D-E-A are gain media 1, a Faraday rotator 2, a reciprocal rotator 3 (such as a half-waveplate) and a polarizer 4.

Figure 2A:
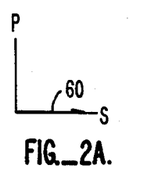
FIGS. 2A through 2E illustrate schematically polarization states within the resonator of FIG. 1 at points A through E, respectively, for counterclockwise beam propagation.
Figure 2B:
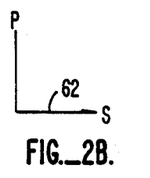
Figure 2C:
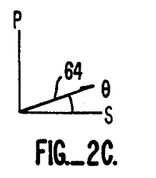
Figure 2D:
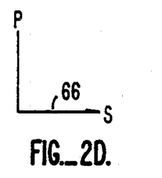
Figure 2E:
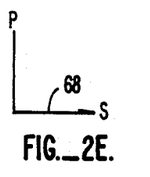
Figure 2F:
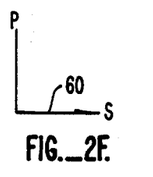
FIG. 2F (identical to FIG. 2A) represents the self-consistent electric field vector after a complete counterclockwise round-trip propagation of a beam through the elements of FIG. 1.

FIGS. 2A through 2E show the polarization states (more precisely, the electric field vectors) for counterclockwise propagation of a beam of radiation through the elements of FIG. 1 along the path A-B-C-D-E-A. The length of the vectors indicate the relative magnitude of the electric field at various points in the resonating cavity. The lengths of the vectors are not to scale. In FIG. 2A, at point A, the electric field vector 60 is linear and aligned with the "S" (low loss) polarization axis. FIG. 2B represents the electric field vector 62 at point B after experiencing gain in gain media 1. FIG. 2C shows the electric field vector 64 with rotated polarization at point C due to nonreciprocal Faraday rotator 2. FIG. 2D shows the electric field vector 66 rotated back to its original "S" orientation at point D due to reciprocal rotator 3. FIG. 2E shows the electric field vector 68 at point E, illustrating that a pure "S" polarization experiences no loss due to polarizer 4. FIG. 2F shows the reduced magnitude of the electric field vector 60 at Point A after one round trip due to finite output coupling at output mirror 8. FIG. 2F is identical to FIG. 2A representing the self-consistent electric field vector 60 after a complete round-trip.

Figure 3A:
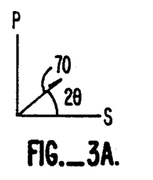
FIGS. 3A through 3E are schematic representations of the polarization states within the resonator of FIG. 1 at points E through A, respectively, for clockwise beam propagation.
Figure 3B:
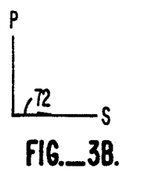
Figure 3C:
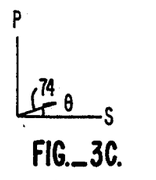
Figure 3D:
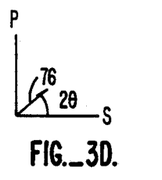
Figure 3E:
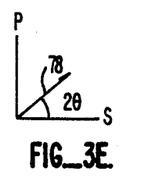
Figure 3F:
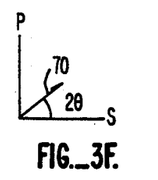
FIG. 3F (identical to FIG. 3A) represents the self consistent electric field vector after a complete clockwise round-trip propagation of a beam through the elements of FIG. 1.

FIGS. 3A through 3F illustrate the clockwise round-trip propagation of a beam of radiation through the elements of FIG. 1. In FIG. 3A, at point E, the electric field vector 70 is rotated. FIG. 3B represents the electric field vector 72 at point D after passing through polarizer 4. It is attenuated and no longer rotated. FIG. 3C shows the electric field vector 74 with rotated polarization at point C due to reciprocal rotator 3. FIG. 3D shows the electric field vector 76 rotated further from its original "S" orientation at point B due to nonreciprocal Faraday rotator 2. FIG. 3E shows the electric field vector 78 at point A, illustrating that a gain is experienced in gain media 1. FIG. 3F shows the identical magnitude of the electric field vector 70 at Point E after one round-trip. FIG. 3F is identical to FIG. 3A representing the self-consistent electric field vector 70 after a complete round-trip. FIGS. 3C and 3D indicate how the rotation due to reciprocal rotator 3 and nonreciprocal Faraday rotator 2, respectively, add for such clockwise rotation. FIGS. 3A and 3B show how such additive polarization rotation results in greater loss at polarizer 4. As a result of this differential loss between the clockwise and counterclockwise propagation directions the ring laser of FIG. 1 will lase preferentially in the counterclockwise direction as shown.

Figure 4:
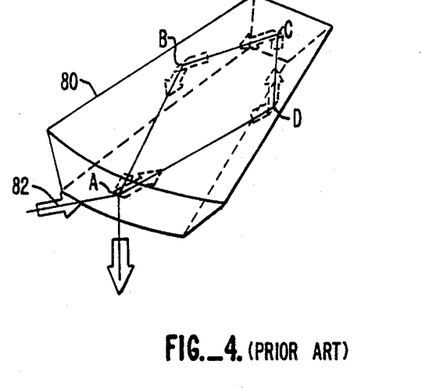
FIG. 4 is a perspective view of a monolithic nonplanar internally reflecting ring laser of the prior art.
Figure 5:
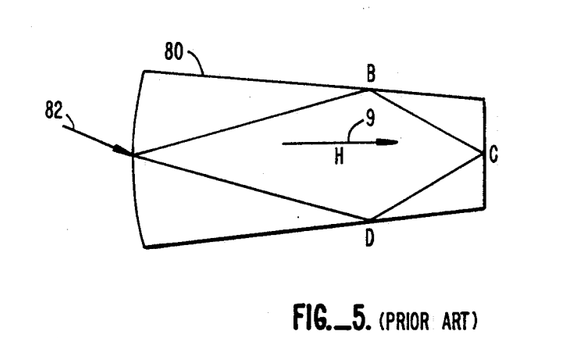
FIG. 5 is a top plan view of a monolithic nonplanar internally reflecting ring laser of the prior art.
Figure 6:
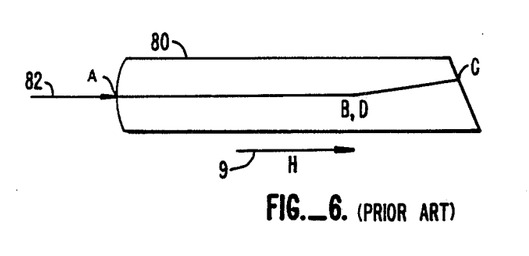
FIG. 6 is a side elevational view of a monolithic nonplanar internally reflecting ring laser of the prior art.

FIGS. 4, 5 and 6 illustrate a specific prior art monolithic nonplanar internally-reflecting ring laser 80 based on U.S. Pat. No. 4,578,793, to Kane and Byer showing how nonreciprocal Faraday rotation can occur within the solid state lasant material itself due to an external magnetic field 9. Non-normal incident radiation 82 at point A results in increased output coupling for the "P" polarization (i.e., higher loss for the internal circulating "P" polarization) and decreased output coupling for the "S" polarization. "P" polarization is in the plane formed including points A, B and D, and "S" polarization is in the planes orthogonal to "P" in which the beam propagates through the media. Reciprocal polarization rotation occurs at total internal reflections at points B, C and D. It is worthwhile to observe that if reflections at points A, B, C and D were all in the same plane, the definition of "S" and "P" polarization would not change and phase shifts at total internal reflections B, C and D would not result in any net polarization rotation. However, because total internal reflections at points B, C and D have different planes of incidence than the reflection at A they have different orientations of "S" and "P" polarizations. The net result of the phase shifts occurring at total internal reflections B, C and D is a reciprocal polarization rotation. These elements combine to generate a differential loss for the counterpropagating waves, with the lowest loss direction being the direction of unidirectional lasing. However, to achieve such an effect, it has been the practice in the prior art to require that the plane formed by points A, B and D differ from the plane formed by points C, B and D. The structure of a laser 80 illustrated in FIGS. 4 through 7 is intricate, which renders high-quantity fabrication difficult and costly.

Figure 7:
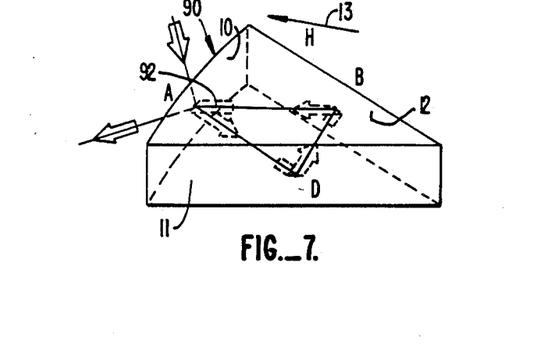
FIG. 7 is a perspective view of a monolithic planar internally reflecting ring laser of the present invention.
Figure 8:
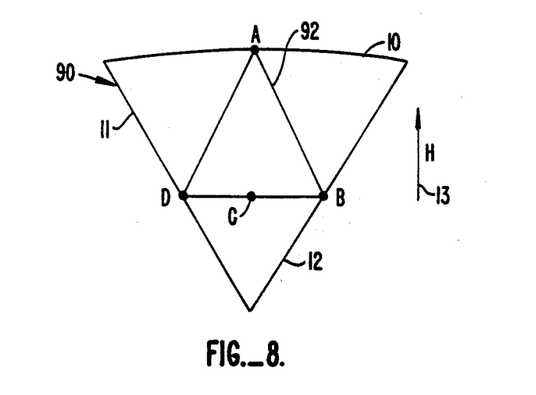
FIG. 8 is a top plan view of a monolithic planar internally reflecting ring laser of the present invention.
Figure 9:
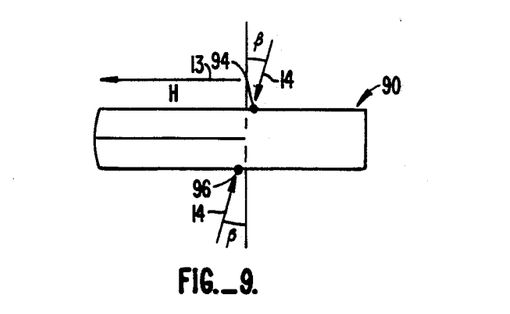
FIG. 9 is a side elevational view of a monolithic planar internally reflecting ring laser of the present invention.

According to the invention, however, and referring to FIGS. 7, 8 and 9, a planar unidirectional solid state laser resonator 90 is realized by inducing a reciprocal polarization rotation along a beam path within nonbirefringent material by means of a mechanical stress or by modifying the material to change the index of refraction along the lasing path. FIGS. 7, 8 and 9 show a specific embodiment of the planar monolithic ring resonator 90 of the present invention. An internal beam 92 reflects between interior faces of a resonator 90, including an output coupler face 10, a first reflector face 11 and a second reflector face 12 which are oriented to direct the beam 92 in a triangular path through points A, D and B on the respective surfaces of the reflectors. In the specific embodiment, a magnetic field 13, represented by the H vector, is generated parallel to the plane A-D-B and normal to the segment D-B. A stress is applied through a point C on segment D-B at an angle $\beta$ to the plane normal to plane A-D-B. Non-normal incidence of an internal beam 92 at point A on the output coupler 10 functions as a partial polarizer. "P" polarization experiences higher output coupling (higher loss) than "S" polarization. Nonreciprocal Faraday rotation occurs along paths A-B and D-A because these legs have a component parallel to H, the external magnetic field. FIG. 9 shows an external stress 14 at opposing points 94 and 96 inclined to the normal by a small angle $\beta$. The angle $\beta$ is on the order of the sum of the Faraday rotation occurring in legs AB and DA.

The applied stress functions as a reciprocal rotator for light propagating along beam path BD. The applied stress causes relative phase shifts, acting effectively as a waveplate. The principal axis of this "effective waveplate" is along the stress axis and consequently is also inclined away from a normal to the plane of lasing by angle $\beta$. The magnitude of the applied stress is preselected. It is chosen such that the sum of the phase shifts occurring due to total internal reflections at points B and D, plus the phase shift of the "effective waveplate" is nominally 180°. This sum phase shift of 180°, when added to the 180° phase shift occurring at the output coupler (mirror) 10 due to image inversion, results in zero (0) total phase shift for complete traversal of the ring path.

Faraday rotation cancels the polarization rotation of the "effective waveplate" due to inclination angle $\beta$ for one direction of propagation, presenting a low-loss linear "S" polarization at the output coupler 10. In the opposite direction of propagation, the Faraday rotation adds to the "effective waveplate" reciprocal rotation, presenting an elliptical polarization state, which is also inclined to the "S" polarization. Such polarization has a finite "P" polarization component which experiences increased output coupling (loss) at output coupler 10. This small differential loss is sufficient to allow the ring to lase preferentially in the first direction of propagation where the Faraday rotation and reciprocal effective waveplate rotations cancel.

A structure according to the invention has been fabricated and tested successfully. Specifically, a 0.65% Neodymium doped YAG planar monolithic ring resonator similar to FIG. 7 was fabricated and coated under instructions of the applicant by Virgo Optics, Port Richey, Fla. The output coupler 10 was a mirrored surface which had a 40 mm spherical radius of curvature coated for power reflectivities at 1064 nm of 98.5% for "S" polarization and <97% for "P" polarization. This coating also had transmittance at 810 nm of greater than 80% for "P" polarization. Legs corresponding to legs AB and DA of FIG. 7 were 6.98 mm. Leg BD was 5.0 mm. The apex angle was 69°. These dimensions result in an internal resonator mode having a 34.5° total internal reflection angle at points B and D of FIG. 7. The corresponding phase shift at each total internal reflection is 39°. The internal reflection angle at point A is 21°. The external angle of the output beam is 40.7°. The entire Nd:YAG slab is 1.5 mm thick. Thinner lasant is also possible according to the invention, as the lasing path is planar.

Figure 10:
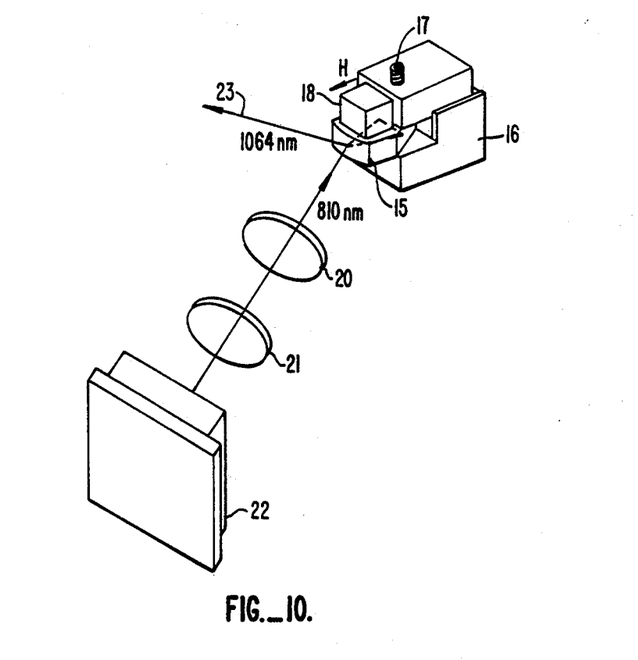
FIG. 10 is a perspective view of the preferred embodiment of the present invention showing laser diode axial pumping and external magnetic field.
Figure 11:
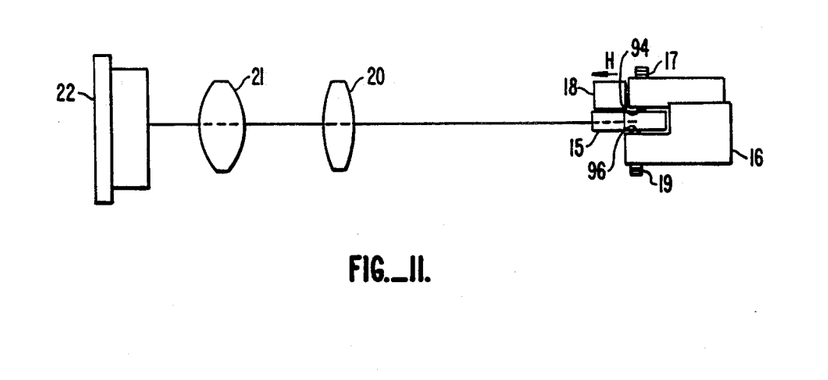
FIG. 11 is a side elevational view of the embodiment of FIG. 10.

FIGS. 10 and 11 illustrate a complete laser structure according to the invention. A monolithic Nd:YAG slab 15 is targeted by a laser diode exciter 22 and surrounded by a magnet 18 applying an external magnetic field. A "C" clamp structure 16 is provided together with brass tipped set screws 17 and 19 (built by Olander Company, Sunnyvale, Calif.), which applies an inclined stress to the Nd:YAG slab 15. The inclination angle $\beta$ of FIG. 9 is approximately 2°. Torque is applied to set screw 17 to achieve the desired approximately 100 phase shift (180° minus 2 times the total internal reflection phase shifts), which is less than 8 oz-inch. A ¼" cubic Neodymium Iron Boron magnet 18 (NeIGT 27H, from I.G. Technologies, Valparaiso, Ind.) of approximately 10,000 Gauss residual induction with the H magnetic field aligned to bisect the angle formed by incident and exiting rays was placed on top of the Nd:YAG slab over most of the legs AB and DA of FIG. 7. A laser diode 22 (Model SLD302XT-25, available from SONY Corporation of America, Cypress, Calif.) was adjusted for 180 mW and temperature tuned to the 808.5 nm absorption of Nd:YAG. Imaging optics 20 and 21 (schematic representations) were provided to correct the astigmatism of laser diode 22 and focus the emission into the internal lasing mode of Nd:YAG slab 15. The laser diode emission is focussed into a region which is smaller than the approximately 100 um internal lasing mode radius of the ring resonator. When axial pumped in this fashion the 1064 nm output, represented by ray 23, of the monolithic Nd:YAG planar ring laser has a power of 23 mW, is unidirectional, single longitudinal mode and single $TEM_{00}$ transverse mode.

Various means may be provided for applying stress to the monolithic ring resonator, in addition to the mechanical means illustrated above. An example is implantation of ions of a different size than the base crystalline structure in the solid state material (for instance with a focused ion beam) at one or both of the contact points 94, 96 (FIG. 11). Stresses due to the addition or displacement of the material in the lattice with foreign ions is thereby used to generate the desired effective waveplate. The magnitude of the phase shifts resulting may be controlled by the size of the region of implantation and ion size. The resultant structure is potentially more stable than mechanically-stressed material.

Figure 17:
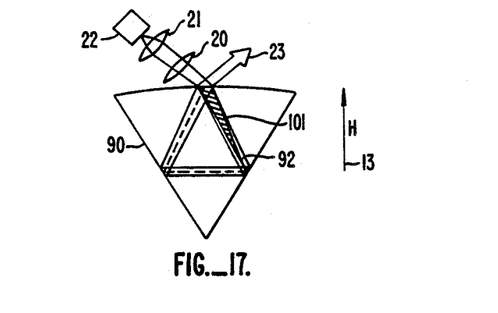
FIG. 17 is a top plan view of axial pumping as it occurs in the preferred embodiment.

FIG. 17 illustrates a method of axial pumping used in the preferred embodiment based on the structure of FIG. 10. The output pump emission of laser diode 22 at approximately 810 nm is focused into the TEM$_{00}$ mode 92 (greatly enlarged for illustration purposes) of a Nd:YAG slab 90 with focussing optics 21 and 22. The region of absorbed laser diode emission 101 is entirely contained within the TEM$_{00}$ mode 92. When axially pumped in this manner, the higher order transverse modes of the ring resonator 90 will not access the available gain as efficiently as the TEM$_{00}$ mode. Consequently, the TEM$_{00}$ mode will saturate the gain and thereby suppress lasing of higher order modes.

Figure 19:
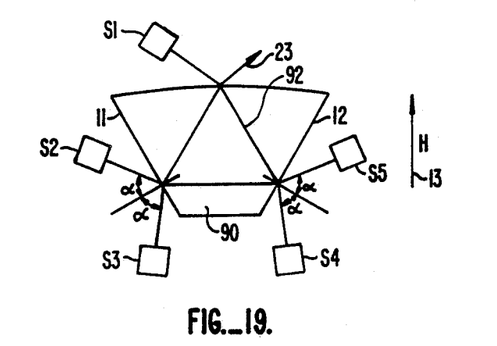
FIG. 19 is a top plan view of multiple source axial pumping according to a specific embodiment of the invention when all reflections use dielectric coatings.

FIG. 19 illustrates an apparatus and a method for using multiple sources to axially pump a monolithic ring laser 11 serving as a stable resonator cavity of the present invention. This structure may be contrasted with that of Sipes (FIG. 18). This technique requires that dielectric coatings be used on reflective surfaces 11 and 12 rather than total internal reflections. The coated surfaces 11 and 12 are highly reflective at the internal lasing wavelength and transmissive to the pump wavelength and polarization at the appropriate angle $\alpha$ determined by Snell's Law. In addition to the laser diode and focussing optics S1 which are used as before, sources S2 through S5 also axially pump TEM$_{00}$ mode 92 as indicated. Using multiple laser diode pump sources to axially pump the monolithic ring laser of the present invention could directly scale the ring laser output for higher power applications.

Figure 20:
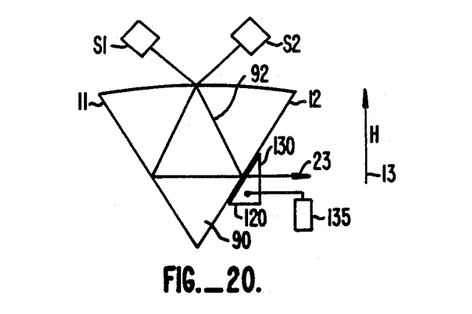
FIG. 20 is a top plan view of output coupling and Q-switching using frustrated total internal reflection (evanescent wave coupling).

FIG. 20 shows an apparatus and illustrates a method of output coupling and optional Q-switching using evanescent wave coupling. Prism 120 is mechanically located next to total internal reflection surface 12 to leave a small gap (on the order of 0.5 microns or one-half wavelength). Adjusting the thickness of this gap varies the amount of circulating internal power which is coupled out of the resonator 23 due to frustrated total internal reflection. Such evanescent wave coupling will preferentially couple "P" polarization and thereby serve as the polarizer required to sustain unidirectional lasing. Using this method of output coupling, reflective surface 10 is made highly reflective at the internal lasing wavelength and transmissive at the pump wavelength of sources S1 and S2. Rigidly fixing the evanescent wave coupler, such as a prism, for instance, at face 130 with the juxtaposed surfaces in parallel and applying a voltage from a switchable voltage source 135 can, for proper piezoelectric prism orientation, change the thickness of the gap. When this thickness is switched rapidly, Q-switching will result. (As used herein, a prism is a nonetalon-shaped solid optically-transmissive element having a higher index of refraction than the gap space.) This type of coupling is particularly useful where output coupling is desired through a reflective surface oriented for total internal reflection relative to the beam path. It permits axial excitation from multiple sources through non-totally internally-reflective surfaces (such as dielectrically-coated surfaces) and variable output coupling through totally-internally reflective surfaces. This output coupler and method of output coupling can be used with any type of solid state ring laser to provide a variable output coupling laser.

Figure 12:
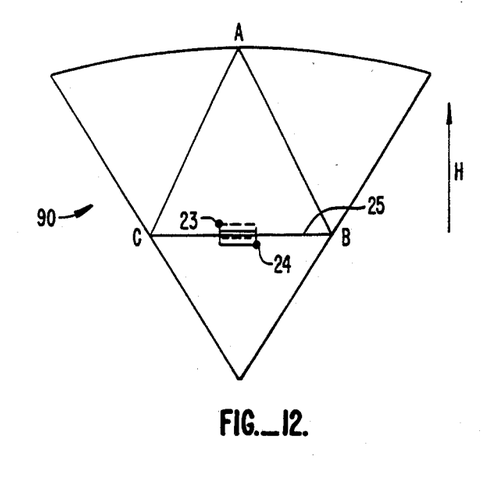
FIG. 12 is a top plan view of an alternative embodiment of the present invention wherein an external electric field serves as the effective waveplate for electro-optic cubic crystals.
Figure 13:
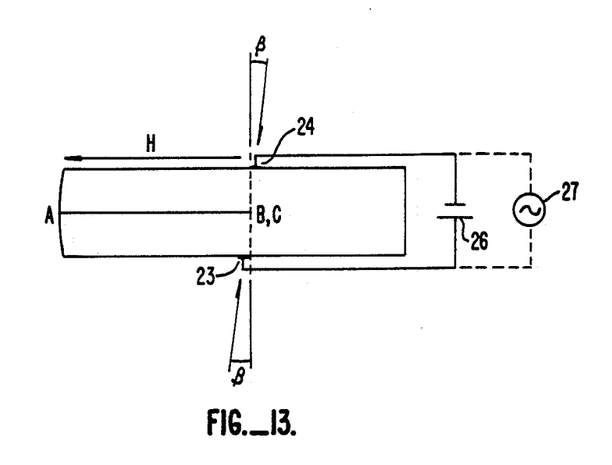
FIG. 13 is a side elevational view of the embodiment of FIG. 12.

FIGS. 12 and 13 show an alternative embodiment of the present invention wherein a monolithic ring structure 90 is made from a cubic crystalline material which lacks a center of symmetry. Such cubic crystals exhibit a first order electro-optic effect. This electro-optic effect is described mathematically with tensors which are identical in form to those tensors which would describe the stress referred to with respect to FIGS. 7 through 9. Consequently such classes of cubic crystalline laser hosts can be made to lase unidirectional and be rapidly tuned by direct substitution of an inclined electric field between points at electrodes 23 and 24 (FIG. 13), instead of an inclined applied stress between points 94 and 96 (FIG. 9). Such an "effective waveplate" formed by the electric field allow tuning rates achieving bandwidths in excess of 1 GHZ.

FIG. 12 illustrates electrodes 23 and 24 contacted directly to the crystal faces in the region of the lasing mode 25. FIG. 13 is a side view showing how electrodes 23 and 24 are inclined by small angle $\beta$ to a normal to the plane of lasing. DC bias 26 is chosen to have a voltage which, due to the electro-optic effect in the crystal, causes a relative phase shift between "S" and "P" polarizations equal to 180° minus the phase shifts due to total internal reflections at reflection points B and C. A smaller, variable voltage 27 can be applied additionally to tune the frequency of the laser rapidly via the electro-optic effect by making small changes in the phase shift of the "effective waveplate" and thereby tuning the resonant frequency of lasing.

Figure 14:
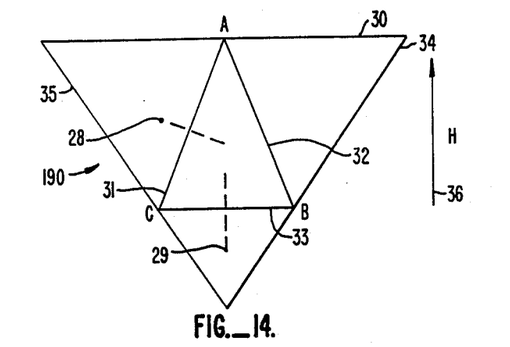
FIG. 14 is a top plan view of a further alternative embodiment of the present invention incorporated into a semiconductor laser diode.
Figure 15:
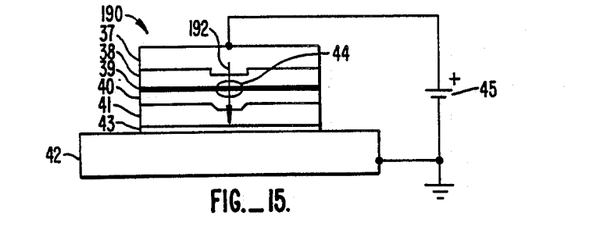
FIG. 15 is a first side cross-sectional view of the embodiment of FIG. 14.
Figure 16:
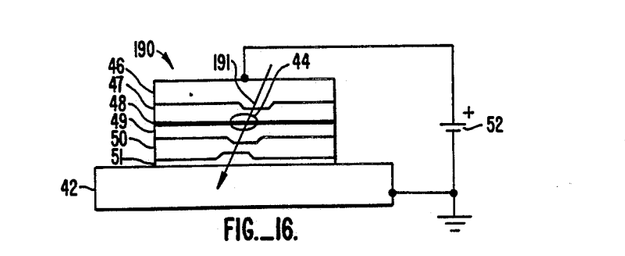
FIG. 16 is a second side cross-sectional view of the embodiment of FIG. 14.

FIGS. 14, 15 and 16 illustrate the present invention as it applies to a planar, thick film, unidirectional semiconductor ring laser 190. Commonly used semiconductor materials such as GaAs and InP are examples of non-centrosymmetric cubic crystalline materials which have an electro-optic effect. Consequently, a specific semiconductor embodiment of the present invention comprises a thick film of such semiconductor materials fabricated as an electro-optically tunable unidirectional ring laser diode. Layers 46 and 51 of FIG. 16 form ohmic contacts which generate an inclined electric field 191 through the active region 44, which in accordance with the present invention provides the reciprocal polarization rotation. (The magnetic field 36 of FIG. 14 provides the nonreciprocal polarization rotation.) FIG. 14 shows a top view of such thick film device 190. Flat surfaces 34 and 35 provide total internal reflections at points B and C, for example achieved by chemically-assisted ion beam etching of the reflective surfaces with SiO$_2$ as the etching mask. A suitable technique is reported in Behfahr-Rad et al., *Appl. Phys. Lett.*, Vol. 54, No. 6, pp. 493–495, (Feb. 6, 1989). Flat surface 30 provides output coupling at point A. Magnetic field 36 causes nonreciprocal Faraday Effect rotation along legs AB and CA.

FIG. 15 shows a cross-section along line 28 of the thick film device on ray path 31. Ray path 32 is identical. The cross-section of FIG. 15 represents the cross section of an index-guided, linear cavity laser diode. Top layer 37 is a heavily p+ doped layer of GaAs for ohmic contact to the laser. Layer 38 is a p type GaAlAs layer to form the anode of the p-n junction. Layer 39 is the active layer wherein recombination of holes and electrons occurs. The laser mode is confined to region 44. Layer 40 is an n-type GaAlAs cathode layer of the laser diode. Layer 41 is an n-type GaAs layer with waveguide depression, which confines the lasing region 44 via index guiding. Layer 43 is a heavily-doped n type GaAs layer for ohmic contact. A metal heat sink 42 is provided, which is grounded. The electric field 192 is normal to the plane of lasing, i.e., not inclined to the active layer 39.

A d.c. power source 45 provides direct current to sustain lasing. The electric field 192 between layers 37 and 43 notably results in phase shifts along ray paths 31 and 32 of the device of FIG. 14 due to the electro-optic effect. However, the axes of these phase shifts are aligned with the "S" and "P" polarizations of the plane of lasing. Consequently, it cannot serve as a tilted reciprocal rotator which is necessary to achieve unidirectional lasing.

A cross-section of at least a portion of ray path 33 of the device of FIG. 14 along, for instance, line 29 is shown in FIG. 16. FIG. 16 is similar to FIG. 15. A major difference, however, is that ridges are provided about the lasing region 44 on layers 46 and 51 which are inclined to a normal to the plane of lasing. These inclined ridges serve to incline the electric field 191 with respect to the "S" and "P" polarizations of the ring plane defined by points A-B-C, thus forming a tilted reciprocal rotator. In conjunction with Faraday Effect rotation due to magnetic field 36 and polarization at the output mirror 30, this rotator will result in unidirectional lasing.

Layer 46 may have a separate current source 52 and be electrically isolated from layer 37 of FIG. 15 so that phase shifts occurring in leg 33 can be independently controlled as required from phase shifts occurring in legs 31 and 32. Because semiconductors are absorbers for light at the bandgap energy, the current sources 45 and 52 need to be adjusted to have sufficient gain to overcome absorption losses. A semiconductor ring laser diode fabricated in accordance with the invention may, by suitable selection of materials, be made to lase at all common laser diode wavelengths. Such semiconductor ring laser diodes would be unidirectional and single frequency. By providing current source 52 with a rapidly-variable AC component, the frequency of such a semiconductor ring laser diode could be tuned rapidly via the electro-optic effect.

The unique characteristics of the invention disclosed herein suggest numerous uses. It will be understood by one of skill in the art that the frequency stability of the various disclosed designs will have clear application in interferometry and metrology. Monolithic resonant external frequency doublers and optical parametric oscillators such as those discussed by Kozlovsky et al, *Opt. Lett.* 13, 1102 (1988) require high frequency stability. Such can be provided by the various designs of the present invention. Frequency-stable ring lasers have been used to injection seed flash-pumped Q-switched Nd:YAG lasers and to injection lock CW lamp pumped lasers. Diode pumped lasers have been proposed as frequency standards either by relying on the absolute stability of the device itself or by locking to saturated absorptions of iodine. Compact, low cost stable single-frequency lasers will have increased applications in high-sensitivity coherent fiber sensors. Ring lasers have found extensive application in laser gyroscopes. If a laser of the present invention is rotated in the plane of lasing, the output frequency of the laser changes. If resonant external doubling is done with a passive device, then piezoelectric, magnetic or electro-optic (where applicable) tuning of the ring resonator of the present invention can provide the fast tuning required to maintain frequency overlap of the two resonators. Such fast frequency tuning means as applied to the present invention is useful in coherent communication applications for rapid tuning of local oscillators used in various heterodyning techniques. Fast frequency tuning is also useful in frequency agile coherent radar applications.

The invention has now been explained with reference to specific embodiments and applications. Still further embodiments will be apparent to those of ordinary skill in the art as suggested by this disclosure. It is therefore not intended that this invention be limited, except as indicated by the appended claims.

I claim:

1. A planar laser resonator comprising:
    a single piece of solid-state laser medium;
    means for reflecting optical energy within said laser medium defining a polygonal lasing path in a single lasing plane;
    means for insuring a single spatial mode of oscillation of said optical energy; and
    means for reciprocally rotating polarization of optical energy inclined to said lasing plane in said solid-state laser medium along said lasing path, said rotating means altering index of refraction along said lasing path to effect unidirectional propagation of said optical energy.

2. The laser resonator according to claim 1 wherein said rotating means comprises means for varying index of refraction inclined to said single lasing plane.

3. The laser resonator according to claim 1 wherein said altering means comprises means for applying a stress to said laser medium to cause a strain on internal structure of said laser medium inclined to said single lasing plane transverse to said lasing path.

4. The laser resonator according to claim 3 wherein said stress applying means comprises means for applying a mechanical force transverse to said single lasing plane.

5. The laser resonator according to claim 4 wherein said mechanical force applying means comprises contacts abutting said laser medium at locations on opposing sides of said medium containing said single lasing plane.

6. The laser resonator according to claim 5 wherein said contacts are compressed against said medium.

7. The laser resonator according to claim 5 wherein said contacts are attached to said medium and are pulled under tension.

8. The laser resonator according to claim 5 wherein said mechanical force applying means further comprises piezoelectric means coupled to said contacts for modulating force applied to said laser medium through said contacts.

9. The laser resonator according to claim 3 wherein said stress applying means further comprises means for causing a temperature gradient transverse to at least a portion of said lasing path and inclined to said lasing plane.

10. The laser resonator according to claim 1 wherein said laser medium is a cubic crystal having no center of symmetry and wherein said rotating means comprises means for producing an electric field transverse to at least a portion of said lasing path and inclined to said single lasing plane in order to electro-optically induce a change in index of refraction in said crystal.

11. The laser resonator according to claim 1 wherein said rotating means comprises an inhomogeneity in index of refraction at at least one selected location along said lasing path, said inhomogeneity being transverse to said lasing path and inclined to said single lasing plane.

12. A planar laser resonator comprising:
    a single piece of solid-state laser medium;

reflecting means within said laser medium defining a polygonal lasing path in a single lasing plane; and
an inhomogeneity in index of refraction of said laser medium at at least one selected location along said lasing path, said inhomogeneity for reciprocally rotating polarization of optical energy inclined to said lasing plane in said solid-state laser medium along said lasing path to effect unidirectional propagation of said optical energy.

13. The laser resonator according to claim 12 wherein said inhomogeneity is a stable change in index of refraction inclined to said single lasing plane.

14. The laser resonator according to claim 13 wherein implanted ions forming a local structural change in said medium define said inhomogeneity in said laser medium.

15. The laser resonator according to claim 1 further comprising:
means for selecting polarization of optical radiation along said lasing path; and
means for providing nonreciprocal rotation of polarization of said optical radiation.

16. The laser resonator according to claim 15 wherein said nonreciprocal polarization rotation means comprises means for applying a magnetic field aligned with the lasing plane.

17. The laser resonator according to claim 15 wherein said laser medium comprises three reflecting surfaces normal to the lasing plane to define a triangular lasing path.

18. The laser resonator according to claim 17 wherein a first one of said reflecting surfaces provides a concave internal reflecting surface to said laser path, said first one of said surfaces being transmissive of lasing radiation at a pumping wavelength and reflective of lasing radiation at lasing wavelength of said laser medium.

19. The laser resonator according to claim 1 further including means for selecting polarization and for coupling laser energy from said laser medium comprising a prism disposed juxtaposed to a point of reflection on said lasing path at a gap from said point of reflection.

20. The laser resonator according to claim 19 further including means for increasing and decreasing said gap to modulate coupling and to control lasing threshold.

21. The laser resonator according to claim 20 wherein said increasing and decreasing means comprises means for varying said gap to Q-switch said laser medium.

22. The laser resonator according to claim 1 wherein said insuring means comprises optical excitation means disposed to direct optical energy along an axis of said lasing path for axially pumping said laser medium.

23. The laser resonator according to claim 22 wherein said optical excitation means comprises a plurality of laser pump sources disposed to couple optical radiation into said laser medium at a plurality of points of reflection on said laser path.

24. A method for controlling stimulated emission of optical radiation in a plane of a single piece of solid-state laser medium comprising the steps of:
reflecting optical energy within said laser medium on a polygonal lasing path in a single lasing plane;
restricting said optical energy to a single spatial mode of oscillation; and
-reciprocally rotating polarization of optical energy inclined to said lasing plane in said solid-state laser medium along said lasing path, altering index of refraction along said lasing path to effect unidirectional propagation of said optical energy.

25. The method according to claim 24 wherein said rotating step comprises varying index of refraction inclined to said single lasing plane.

26. The method according to claim 24 wherein said altering step comprises applying a stress to said laser medium to cause a strain on internal structure of said laser medium inclined to said single lasing plane transverse to said lasing path.

27. The method according to claim 26 wherein said stress applying step comprises applying a mechanical force transverse to said single lasing plane.

28. The method according to claim 27 wherein said mechanical force applying step comprises abutting contacts to said laser medium at locations on opposing sides of said medium containing said single lasing plane.

29. The method according to claim 28 comprising compressing said contacts.

30. The method according to claim 28 wherein said contacts are attached to said laser medium and said mechanical force applying step comprises pulling apart said contacts.

31. The method according to claim 28 wherein said mechanical force applying step further comprises piezoelectrically modulating force applied to said laser medium through said contacts.

32. The method according to claim 26 wherein said stress applying step further comprises heating said medium transverse to said lasing path and inclined to said lasing plane.

33. The method according to claim 24 wherein said laser medium is a cubic crystal having no center of symmetry and wherein said rotating step comprises producing an electrical field transverse to said lasing path and inclined to said single lasing plane in order to electro-optically induce a change in index refraction in said crystal.

34. The method according to claim 24 wherein said rotating step comprises producing an inhomogeneity in index of refraction at at least one selected location along said lasing path, said inhomogeneity being transverse to said lasing path and inclined to said single lasing path.

35. The method according to claim 34 wherein said inhomogeneity producing step comprises implanting ions in said laser medium locally in sufficient quantity to induce a local structural change in said laser medium.

36. The method according to claim 24 further comprising the steps of:
polarizing optical radiation on said lasing path; and
rotating nonreciprocally polarization of said optical radiation along said lasing path wherein said reciprocal rotation of polarization and said nonreciprocal rotation of polarization are sufficient to sustain unidirectional lasing.

37. The method according to claim 36 wherein said rotating step comprises applying a magnetic field aligned with the lasing plane.

38. The method according to claim 36 further comprising reflecting said optical radiation off of internal surfaces of said laser medium normal to the lasing plane to define a triangular lasing path.

39. The method according to claim 24 further including selecting polarization and coupling laser energy from said laser medium through a prism disposed juxtaposed to a point of reflection on said lasing path at a gap from said point of reflection.

40. The method according to claim 39 further including the step of increasing and decreasing said gap in order to modulate coupling and to control lasing threshold.

41. The method according to claim 40 wherein said increasing and decreasing step comprises varying said gap to Q-switch said laser medium.

42. The method according to claim 24 further including axially pumping said laser medium along an axis of said lasing path with an optical excitation means.

43. The method according to claim 42 wherein said pumping step comprises directing radiation of a plurality of laser pump sources at said medium to couple optical radiation into said laser medium at a plurality of points of reflection on said laser path.

44. A laser comprising:
a single piece of solid-state laser medium;
means for exciting said laser medium;
means for reflecting optical energy within said laser medium defining a lasing path;
means for insuring a single spatial mode of oscillation of said optical energy;
means for constraining propagation of optical energy to a single direction along said lasing path; and
means for coupling and selecting polarization of laser energy from said laser medium, said coupling and selecting means comprising a prism disposed juxtaposed to a point of reflection on said lasing path at a gap from said point of reflection.

45. The laser according to claim 44 further including means for increasing and decreasing said gap in order to modulate coupling and to control lasing threshold.

46. The laser according to claim 45 wherein said increasing and decreasing means comprises means for Q-switching said laser medium.

47. A method for controlling stimulated emission of optical radiation in a single piece of solidstate laser medium having boundaries defining a cavity supportive of optical resonance, said method comprising the steps of:
reflecting optical energy within said laser medium on a lasing path;
constraining propagation of optical energy to a single spatial mode and in single direction along said lasing path; and
polarizing said reflected optical energy while coupling a portion of said reflected optical energy from said laser medium through a prism, said prism being disposed juxtaposed to a point of reflection on said lasing path at a gap from said point of reflection.

48. The method according to claim 47 further including the step of increasing and decreasing said gap to modulate coupling and to control lasing threshold.

49. The method according to claim 48 wherein said increasing and decreasing step comprises varying said gap to Q-switch said laser medium.

50. The laser resonator according to claim 10 wherein said cubic crystal is a semiconductive material and wherein said single piece of said solid state laser medium is a layered solid state structure.

* * * * *